US012249908B2

(12) United States Patent
Beck et al.

(10) Patent No.: US 12,249,908 B2
(45) Date of Patent: Mar. 11, 2025

(54) ELECTRICAL COMPONENT AND METHOD FOR MANUFACTURING AN ELECTRONIC COMPONENT

(71) Applicant: TDK Electronics AG, Munich (DE)

(72) Inventors: Fabian Beck, Rüttenen (CH); Ralf Deisenhofer, Senden (DE); Wolfgang Rambow, Essen (DE)

(73) Assignee: TDK ELECTRONICS AG, Munich (DE)

( * ) Notice: Subject to any disclaimer, the term of this patent is extended or adjusted under 35 U.S.C. 154(b) by 218 days.

(21) Appl. No.: 17/617,688

(22) PCT Filed: Jun. 24, 2020

(86) PCT No.: PCT/EP2020/067735
§ 371 (c)(1),
(2) Date: Dec. 9, 2021

(87) PCT Pub. No.: WO2020/260408
PCT Pub. Date: Dec. 30, 2020

(65) Prior Publication Data
US 2022/0239219 A1 Jul. 28, 2022

(30) Foreign Application Priority Data

Jun. 25, 2019 (DE) .......................... 102019004401.0
Aug. 29, 2019 (DE) .......................... 102019123197.3

(51) Int. Cl.
*H02M 1/44* (2007.01)
*H02M 1/14* (2006.01)
*H02M 7/00* (2006.01)

(52) U.S. Cl.
CPC ............... *H02M 1/44* (2013.01); *H02M 1/14* (2013.01); *H02M 7/003* (2013.01)

(58) Field of Classification Search
CPC ........... H02M 1/14; H02M 1/44; H02M 7/003
See application file for complete search history.

(56) References Cited

U.S. PATENT DOCUMENTS 4,372,865 A * 2/1983 Yu ....................... C04B 35/2658
252/62.62
4,888,675 A 12/1989 Kumar et al.
(Continued)

FOREIGN PATENT DOCUMENTS

CN 102428635 A 4/2012
CN 104052251 A * 9/2014 .............. H02M 1/10
(Continued)

OTHER PUBLICATIONS

International Search Report and Written Opinion of International Searching Authority corresponding to International Patent Application No. PCT/EP2020/067735, mailed Sep. 14, 2020 (9 pages).
(Continued)

*Primary Examiner* — Jue Zhang
(74) *Attorney, Agent, or Firm* — Nixon Peabody LLP

(57) ABSTRACT

An electrical component having a DC link capacitor and an EMC filter. The electrical component includes an input port and an output port. The EMC filter includes a first filter stage and a second filter stage. The first filter stage is arranged between the input port and the DC link capacitor, and the second filter stage is arranged between the output port and the DC link capacitor. Another aspect concerns a method for manufacturing an electronic component.

20 Claims, 4 Drawing Sheets

(56) References Cited

U.S. PATENT DOCUMENTS

| | | | | |
|---|---|---|---|---|
| 2012/0257429 A1* | 10/2012 | Dong | ............... | H02M 7/48 363/127 |
| 2014/0266507 A1 | 9/2014 | Fauer | | |
| 2017/0063218 A1 | 3/2017 | Nishizawa | | |
| 2019/0081554 A1 | 3/2019 | Werker | | |
| 2019/0312522 A1* | 10/2019 | Li | ............... | H02M 1/44 |
| 2020/0067298 A1 | 3/2020 | Lindenberger | | |

FOREIGN PATENT DOCUMENTS

| | | |
|---|---|---|
| CN | 107852087 A | 3/2018 |
| CN | 108809065 A | 11/2018 |
| DE | 102015107676 A1 | 11/2016 |
| DE | 112015002084 T5 | 1/2017 |
| DE | 102017109499 A1 | 11/2018 |
| DE | 102017213543 A1 | 2/2019 |
| JP | H01160357 A | 6/1989 |
| JP | 2002094348 A | 3/2002 |
| JP | 2010-288381 A | 12/2010 |
| JP | 2014500650 A | 1/2014 |
| JP | 2018098891 A | 6/2018 |

OTHER PUBLICATIONS

Notice of Reasons for Rejection issued in Japanese Patent Application No. 2021-576753, dated Feb. 17, 2023, with machine translation (6 pages).

Examination Report in corresponding European Patent Application No. 20734904.4, dated Feb. 26, 2024 (7 pages).

Qian Liu et al.; "EMI Suppression in Voltage Source Converters by Utilizing dc-link Decoupling Capacitors"; IEEE Transactions on Power Electronics, vol. 22, No. 4, pp. 1417-1428; Jul. 1, 2007; ISSN: 0885-8993; DOI: 10.1109/TPEL.2007.900593 (12 pages).

Schaffner; "Data Sheet: Two-Stage Filters FN 2090 Multi-stage EMI Filter with Excellent Attenuation Performance"; Dec. 31, 2016; retrieved from https://docs.rs-online.com/d5ae/ 0900766b81523b7d.pdf; XP093132677 (5 pages).

Examination Report in corresponding Japanese Patent Application No. 2023-222679, in Japanese, dated Nov. 17, 2024 (5 pages).

Examination Report in related Chinese Patent Application No. 202080046954.X, in Chinese, dated Jan. 25, 2025 (14 pages).

\* cited by examiner

ELECTRICAL COMPONENT AND METHOD FOR MANUFACTURING AN ELECTRONIC COMPONENT

CROSS-REFERENCE TO RELATED APPLICATIONS

This application is a U.S. National Stage of International Application No. PCT/EP2020/067735, filed Jun. 24, 2020, which claims the benefit of and priority to (1) Germany Patent Application No. 102019004401.0, filed Jun. 25, 2019, and (2) Germany Patent Application No. 102019123197.3, filed Aug. 29, 2019, all of which are incorporated herein by reference in their respective entireties.

The present invention concerns an electrical component which can be used in a power inverter circuit and a method for manufacturing an electronic component. A power inverter circuit is an electronic device or circuitry that changes direct current (DC) to alternating current (AC).

Power inverter circuits are used in electric vehicles for converting a direct current provided by a battery into an alternating current required by the motor. Therefore, power inverter circuits can be connected to an electric vehicle battery pack which provides a direct current at a voltage which is preferably in the range of 300 to 800 V. Especially in automotive applications, volume and weight optimization is a key discipline.

It is an object the present invention to provide an improved electrical component and a method for its manufacture.

This object is solved by the subject-matter of claim 1 and by the second independent claim.

An electrical component is provided which comprises a DC link capacitor and an EMC filter. The electrical component comprises an input port and an output port. The EMC filter comprises at least a first filter stage and a second filter stage. The first filter stage is arranged between the input port and the DC link capacitor and the second filter stage is arranged between the output port and the DC link capacitor.

The DC link capacitor can be configured to store energy. In particular, the DC link capacitor can be an interim storage capacitor. The DC link capacitor can be configured to be used as a load-balancing energy storage device. The DC link capacitor can be configured to protect a power inverter circuit from momentary voltage spikes, surges and EMI. The DC link capacitor can have a capacitance in the range of 50 to 1000 µF, preferably in the range of 100 to 300 µF. Alternatively, the DC link capacitor can have a capacity of more than 1000 µF.

The DC link capacitor can be one of a film capacitor which comprises a plastic film, a ceramic capacitor or an aluminum electrolytic capacitor. Alternatively, the DC link capacitor can comprise any other dielectric material.

The EMC filter can be configured to limit unwanted emissions and to increase the immunity of a power inverter circuit.

Each filter stage of the EMC filter can be configured to provide filtering. Each filter stage can comprise at least one filter element. In particular, each filter stage can comprise at least one filter element selected from a snubber capacitor, a y-capacitor, a x-capacitor and a magnetic element operating as an inductor.

Each of the snubber capacitor, the y-capacitor, the x-capacitor can be one of a film capacitor which comprises a plastic film, a ceramic capacitor or an aluminum electrolytic capacitor. Alternatively, the snubber capacitor, the y-capacitor and the x-capacitor can comprise any other dielectric material.

The term "electrical component" may refer to a component which comprises a single housing or chassis in which all elements of the component are arranged. The electrical component may be configured for interim storage of energy in the DC link capacitor when, at a particular moment, the energy is not required at the output port. The electrical component may be configured for filtering noises or other disturbances in an electrical signal.

By combining the DC link capacitor and the EMC filter to a single electrical component, the overall volume requirement can be reduced compared to a DC link capacitor combined with a separate EMC filter.

The electrical component may not comprise an interface between the DC link capacitor and the EMC filter which has to be closed when assembling the electrical component. Thus, the complexity of the electrical connection of the component to a power inverter circuit can be reduced as no separate interface between the DC link capacitor and the EMC filter has to be closed. Thereby, the manufacturing or assembly time can be reduced and the risk of a wrong assembly can also be reduced.

By arranging the first filter stage and the second filter stage on opposing sides of the DC link capacitor, the migration of noise to the DC link capacitor from the input port or from the output port can be reduced or even avoided. In particular, the output port can be connected to an inverter semiconductor bridge which can be a source for noise, parasitic current or other disturbances. By ensuring that the second filter stage is arranged between the output port and the DC link capacitor, the DC link capacitor is protected from the disturbances. The noise can be damped close to its source by the second filter stage before the noise affects the DC link capacitor.

The first filter stage and the second filter stage can reduce ringing which results from parasitic inductances of the DC link capacitor by their arrangement on both sides of the capacitor.

In one embodiment, the EMC filter comprises a further filter stage. The further filter stage may be a third filter stage. The EMC filter may comprise more than three filter stages.

The EMC filter and the DC link capacitors can be integrated into a single circuit. The single circuit comprises the input port and the output port of the electrical component.

The input port may be configured for connecting the electrical component to a DC input and the output port may be configured for connecting the electrical component to an inverter semiconductor bridge. The electrical component may be configured to receive a direct current at the input port and to provide a direct current at the output port.

The second filter stage may be configured to avoid noise migration to the DC link capacitor. In particular, any noise provided at the output port of the electrical component, for example by an inverter semiconductor bridge, can be directly filtered and damped by the second filter stage before reaching the DC link capacitor. Accordingly, the second filter stage can be considered as an early filter stage. The second filter stage can be configured to filter noise close to the source before it can spread in a power inverter circuit.

The second filter stage can comprise a snubber capacitor. The snubber capacitor can be configured to form an LC filter in combination with a magnetic element wherein the snubber capacitor compensates a leakage inductance of the magnetic element. The snubber capacitor can be an energy-absorbing circuit used to eliminate voltage spikes caused by a circuit inductance when a switch or the inverter semiconductor bridge opens. The purpose of the snubber capacitor is to improve electromagnetic compatibility by eliminating the voltage transient that occurs when a switch abruptly opens, or by suppressing sparking of switch contacts, or by limiting the voltage slew rate of semiconductor switches like thyristors, GTO thyristors, IGBTs and bipolar transistors.

The snubber capacitor can have a capacitance in the range of 0.1 μF to 10 μF. The snubber capacitor can have a capacitance which is significantly smaller than the capacitance of the DC link capacitor. For example, the snubber capacitor can have a capacitance which is less than a tenth of the capacitance of the DC link capacitor, preferably less than 3 percent of the capacitance of the DC link capacitor.

The second filter stage can comprise at least one y-capacitor which is connected between a signal line and a reference potential. In some embodiments, the y-capacitor is combined with a resistive element which is connected in series with the y-capacitor and which provides resistive damping.

The second filter stage can comprise a magnetic element operating as an inductor. The magnetic element can be arranged in a signal line. The signal line may connect a terminal of the input port and a terminal of the output port. The second filter stage can comprise two magnetic elements each operating as an inductor.

The magnetic elements may each comprise a nickel-zinc or manganese-zinc ferrite core or a nanocrystalline tape core. Both of these materials provide a good filtering at frequencies of $10^5$ to $10^8$ Hz. Thus, these magnetic elements are configured to damp ringing resulting from a parasitic inductance of the DC link capacitor.

The first filter stage can comprise an x-capacitor connected between two signal lines. The x-capacitor can have a capacitance in the range of 0.1 μF to 10 μF. The x-capacitor can have a capacitance which is significantly smaller than the capacitance of the DC link capacitor. For example, the x-capacitor can have a capacitance which is less than a tenth of the capacitance of the DC link capacitor, preferably less than 3 percent of the capacitance of the DC link capacitor.

The first filter stage can comprise at least one y-capacitor which is connected between a signal line and a reference potential. In some embodiments, the y-capacitor is combined with a resistive element which is connected in series with the y-capacitor and which provides resistive damping.

The first filter stage can comprise a magnetic element operating as an inductor. The magnetic element of the first filter stage may comprise a nickel-zinc or a manganese-zinc ferrite core or a nanocrystalline tape core. Both of these materials provide a good filtering at frequencies of $10^5$ to $10^8$ Hz. Thus, these magnetic elements are configured to damp ringing resulting from a parasitic inductance of the DC link capacitor.

The DC link capacitor can be configured to provide capacitive noise suppression. By arranging the DC link capacitor between the two filter stages which each comprise a magnetic element operating as an inductor, the DC link capacitor can also be used as an interference-suppression capacitor.

According to one embodiment, the electrical component may comprises at least one sensor and/or at least one functional component. The sensor may be a temperature sensor, a current sensor, a humidity sensor, a pressure sensor or a gas sensor. The electrical component can also comprise more than one sensor selected from a temperature sensor, a current sensor, a humidity sensor, a pressure sensor and a gas sensor. The functional component may be a module for transferring data.

According to a further aspect, the present invention concerns a power inverter circuit which comprises the above-described electrical component and an inverter semiconductor bridge wherein the output port of the electrical component is connected to the inverter semiconductor bridge.

Another aspect concerns a method for manufacturing the above described electronic component. The preferred method comprises the steps of:
 a. manufacturing functional DC link capacitor units,
 b. connecting the functional DC link capacitor units to a busbar,
 c. manufacturing an EMC filter or filter sub-units which comprises a first filter stage and a second filter stage,
 d. assembling the functional DC link capacitor units connected to the busbar and the EMC filter or the filter sub-units in a housing.

The steps do not necessarily have to be performed in the above given order. In particular, step c. can be performed either before step a., or before step b. or before step d.

In step d., a sensor and/or a functional component may assembled in the housing. The sensor may be a temperature sensor, a current sensor, a humidity sensor, a pressure sensor or a gas sensor. The electrical component can also comprise more than one sensor selected from a temperature sensor, a current sensor, a humidity sensor, a pressure sensor and a gas sensor. The functional component may be a module for transferring data.

In the following, preferred embodiments of the present invention are described with reference to the figures.

Figure 1:
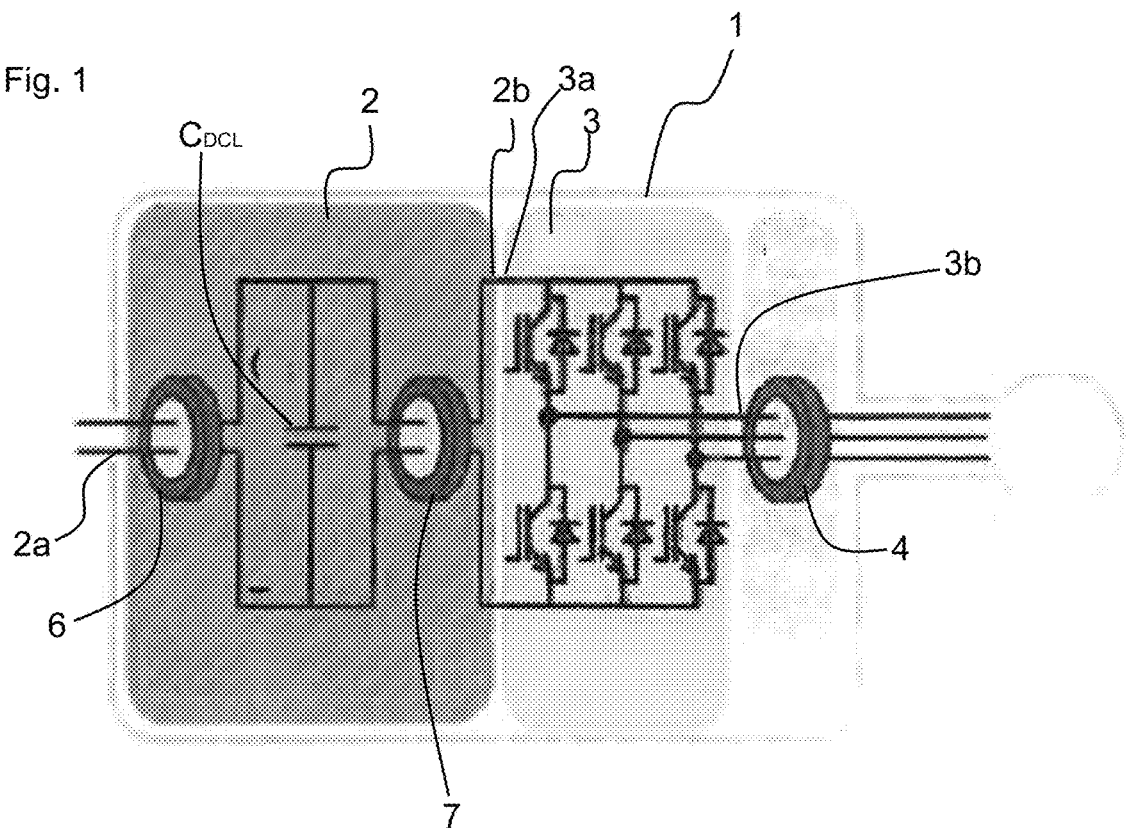
FIG. 1 shows a power inverter circuit.

FIG. 1 shows a power inverter circuit 1. The power inverter circuit 1 comprises an electrical component 2, an inverter semiconductor bridge 3 and a magnetic element 4. The electrical component 2 comprises an input port 2a and an output port 2b. The input port 2a of the electrical component 2 is also the input port of the power inverter circuit 1. The input port 2a of the electrical component 2 is configured to be connected to a DC input, for example a battery.

The inverter semiconductor bridge 3 comprises an input port 3a and an output port 3b. The output port 2b of the electrical component 2 is configured to be connected to the input port 3a of the inverter semiconductor bridge 3. The output port 3b of the inverter semiconductor bridge 3 is configured to be connected to a cable wherein the inverter semiconductor bridge 3 is configured to provide an alternating current to the cable. The cable is configured to be connected to a motor. The magnetic element 4 is arranged around the output port 3b of the inverter semiconductor bridge 3. The magnetic element 4 is configured to provide a filtering of the alternating current provided at the output port 3b of the inverter semiconductor bridge 3.

The inverter semiconductor bridge 3 is configured to transform a direct current provided at the input port of the power inverter circuit 1 into an alternating current provided at the output port of the power inverter circuit 1. The inverter semiconductor bridge 3 comprises one or more transistors.

The electrical component comprises a DC link capacitor $C_{DCL}$ and an EMC filter (EMC=electromagnetic compatibility). The DC link capacitor $C_{DCL}$ is configured to store energy. The EMC filter is configured to limit unwanted emissions and to increase the inverter immunity.

The DC link capacitor $C_{DCL}$ and the EMC filter of the electrical component are integrated into a single circuit. Thus, for connecting the DC link capacitor $C_{DCL}$ and the EMC filter to the power inverter circuit 1, only a single interface connection between the electrical component 2 and the inverter semiconductor bridge 3 has to be closed.

The EMC filter comprises a first filter stage 6 and a second filter stage 7 which are schematically indicated in FIG. 1. The first filter stage 6 is arranged between the input port 2a of the electrical component 2 and the DC link capacitor $C_{DCL}$. The second filter stage 7 is arranged between the output port 2b of the electrical component 2 and the DC link capacitor $C_{DCL}$.

During operation of the power inverter circuit 1, parasitic currents and disturbances can be generated in the inverter semiconductor bridge 3. By arranging the second filter stage 7 at the output port 2b of the electrical component 2, the second filter stage 7 is arranged close to the inverter semiconductor bridge 3. Accordingly, the second filter stage 7 can filter and reduce any parasitic current or disturbances generated in the inverter semiconductor bridge 3 before the parasitic currents or disturbances can reach the DC link capacitor $C_{DCL}$. Thus, the second filter stage 7 can avoid noise migration from the inverter semiconductor bridge 3 to the DC link capacitor $C_{DCL}$. The second filter stage 7 is configured to filter noise right at the source before it can spread in an uncontrolled manner within the power inverter circuit. Accordingly, the second filter stage 7 is an early filter stage.

The first filter stage 6 is arranged between the DC link capacitor $C_{DCL}$ and the input port 2a such that the first filter stage 6 is configured to filter and reduce any noise or parasitic currents provided at the input port 2a before the noise can mitigate into the DC link capacitor $C_{DCL}$.

Figure 2:
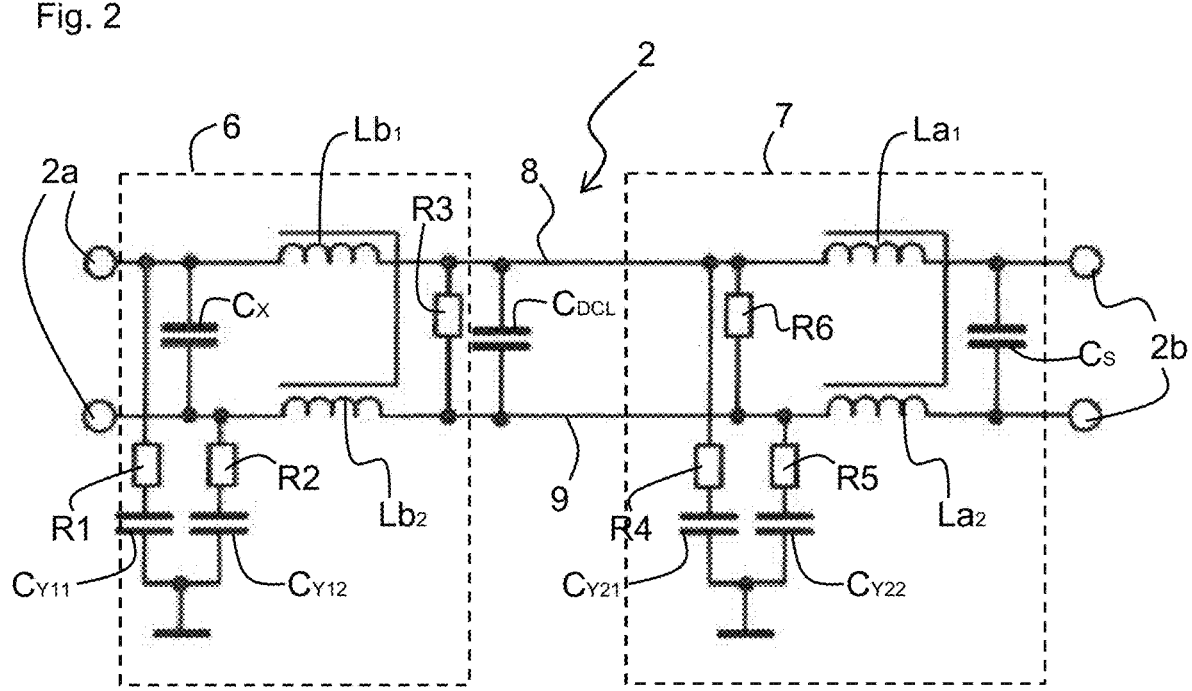
FIG. 2 shows a circuit diagram of an electrical component of the power inverter circuit.

The electrical component 2 is discussed in detail with respect to FIG. 2 which shows a circuit diagram of the electrical component 2. In particular, FIG. 2 shows the first filter stage 6 and the second filter stage 7 in more detail.

The input port 2a and the output port 2b of the electrical component 2 each comprise two terminals. A first terminal of the input port 2a is connected by the first signal line 8 to a first terminal of the output port 2b. A second terminal of the input port 2a is connected by a second signal line 9 to a second terminal of the output port 2b.

The first filter stage 6 comprises a first y-capacitor $C_{y11}$, a second y-capacitor $C_{y12}$, an x-capacitor $C_x$, a first magnetic element $Lb_1$ and a second magnetic element $Lb_2$ wherein each of the magnetic elements $Lb_1$, $Lb_2$ operates as an inductor.

The y-capacitors $C_{y11}$, $C_{y12}$ are designed to filter out common-mode noise. The first y-capacitor $C_{y11}$ of the first filter stage 6 is connected to the first signal line 8 and a reference potential. The reference potential can be a housing or a chassis of the electrical component 2. The first Y-capacitor $C_{y11}$ is connected in series with a first resistor R1. In particular, the first signal line 8 is connected via the first resistor R1 and the first y-capacitor $C_{y11}$ of the first filter stage 6 to the reference potential. The first resistor R1 provides resistive damping.

The second y-capacitor $C_{y12}$ of the first filter stage 6 is connected to the second signal line 9 and to the reference potential. In particular, the second signal line 9 is connected via a second resistor R2, the second Y-capacitor $C_{y12}$ to the reference potential.

The x-capacitor $C_x$ is connected between the two signal lines 8, 9. The x-capacitor $C_x$ is configured to protect the power inverter circuit 1 against differential mode interference.

Each of the magnetic elements $Lb_1$, $Lb_2$ comprises a core. According to one embodiment, the cores comprise manganese-zinc ferrite. According to another embodiment, the cores comprise nanocrystalline tape cores.

The first magnetic element $Lb_1$ is arranged around the first signal line 8. The second magnetic element $Lb_2$ is arranged around the second signal line 9.

Additionally, the first filter stage 6 comprises a third resistor R3 which is connected between the two signal lines 8, 9. The third resistor R3 is connected parallel to the DC link capacitor $C_{DCL}$.

The second filter stage 7 comprises a first y-capacitor $C_{y21}$, a second y-capacitor $C_{y22}$, a snubber capacitor $C_S$, a first magnetic element $La_1$ and a second magnetic element $La_2$, each of the magnetic elements $La_1$, $La_2$ operating as inductors.

The y-capacitors $C_{y21}$, $C_{y22}$ of the second filter stage 7 are designed to filter out common-mode noise. The first y-capacitor $C_{y21}$ of the second filter stage 7 is connected to the first signal line 8 and a reference potential. The reference potential can be a housing or a chassis of the electrical component 2. The first Y-capacitor $C_{y21}$ is connected in series with a fourth resistor R4. In particular, the first signal line 8 is connected via the fourth resistor R4 and the first y-capacitor $C_{y21}$ of the second filter stage 7 to the reference potential. The fourth resistor R4 provides resistive damping.

The second y-capacitor $C_{y22}$ of the second filter stage 7 is connected to the second signal line 9 and to the reference potential. In particular, the second signal line 9 is connected via a fifth resistor R5 and the second Y-capacitor $C_{y22}$ to the reference potential.

The snubber capacitor $C_S$ is connected between the two signal lines 8, 9.

Each of the magnetic elements $La_1$, $La_2$ of the second filter stage 7 comprises a core. According to one embodiment, the cores comprise manganese-zinc ferrite. According to another embodiment, the cores comprise nanocrystalline tape cores.

The first magnetic element $La_1$ is arranged around the first signal line 8. The second magnetic element $La_2$ is arranged around the second signal line 9.

Additionally, the second filter stage 7 comprises a sixth resistor R6 which is connected between the two signal lines 8, 9. The sixth resistor R6 is connected parallel to the DC link capacitor $C_{DCL}$.

The magnetic elements $La_1$, $La_2$ are configured to decouple a parasitic current provided at the output port 2b of the electrical component 2. In particular, current peaks of a parasitic current can be damped by the magnetic elements $La_1$, $La_2$. At the same time, the magnetic elements $La_1$, $La_2$ operating as an inductor create a leakage inductance which is compensated by the snubber capacitor $C_S$. Accordingly, the magnetic elements $La_1$, $La_2$ and the snubber capacitor $C_S$ provide an LC-filter.

Each of the first filter stage 6 and the second filter stage 7 forms an LC-filter which is additionally combined with y-capacitors. As the DC link capacitor $C_{DCL}$ is arranged between the two filter stages 6, 7 which each comprise a magnetic element $Lb_1$, $Lb_2$, $La_1$, $La_2$ operating as an inductor, the DC link capacitor $C_{DCL}$ is configured and arranged to provide capacitive noise suppression. Accordingly, the DC link capacitor $C_{DCL}$ provides an additional pole in the filter circuit and helps to reduce the overall amount of additional symmetrical capacitors in the circuit.

Parasitic inductances of the DC link capacitor $C_{DCL}$ can result in ringing. The two filter stages 6, 7 of the EMC filter comprising y-capacitors $C_{y11}$, $C_{y12}$, $C_{y21}$, $C_{y22}$, the snubber capacitor $C_S$ and, respectively, the x-capacitor $C_x$ can reduce the unwanted ringing.

Figure 3:
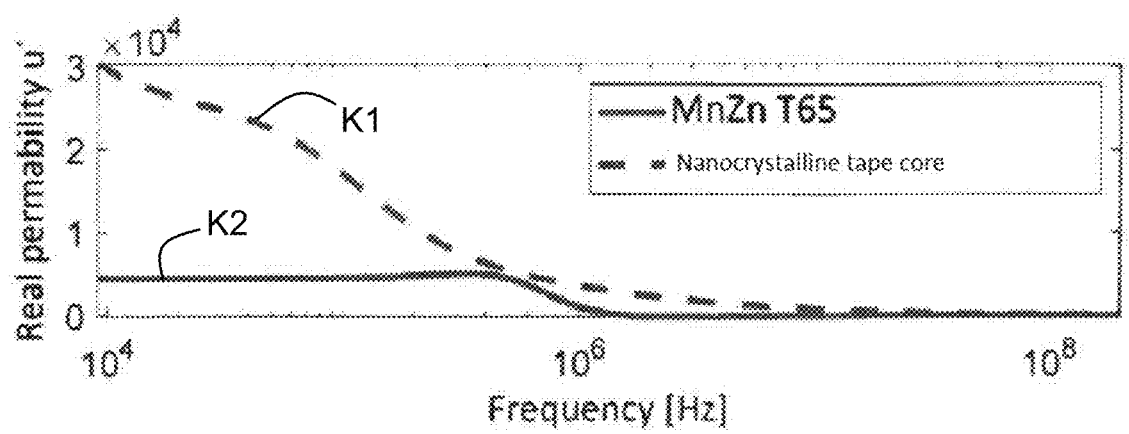
FIGS. 3 and 4 show the permeability for two cores which can be used as magnetic elements.
Figure 4:
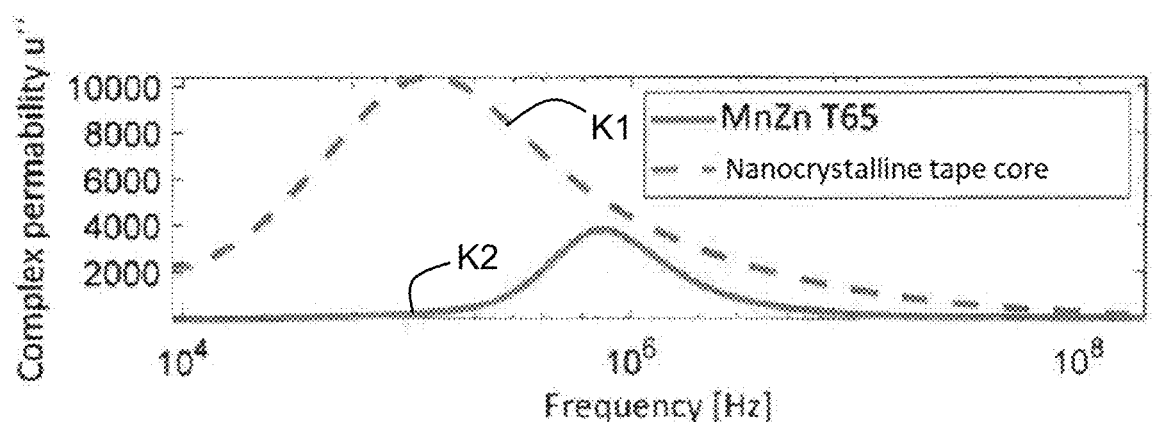

FIGS. 3 and 4 show the permeability for two cores which can be used as magnetic elements $Lb_1$, $Lb_2$, $La_1$, $La_2$ for different frequencies. FIG. 3 shows the real permeability and FIG. 4 shows the complex permeability of the two cores. According to a first embodiment, the cores of the magnetic elements $Lb_1$, $Lb_2$, $La_1$, $La_2$ are MnZn cores. According to a second embodiment, the cores are nanocrystalline tape cores. The curves K1 show the real and complex permeability of the cores of the first embodiment and the curves K2 show the real and complex permeability of the cores of the second embodiment.

Both cores have, in general, losses in the range above 100 KHz which help to damp ringing. The complex part of the permeability shown in FIG. 4 reflects the losses. It can be seen in FIG. 4 that the MnZn core provides high losses and therefore good filtering for frequencies of roughly $10^6$ Hz. Further, the nanocrystalline tape cores provide particularly good filtering for frequencies of roughly 100 KHz. The nanocrystalline tape cores can provide good losses in the kilohertz up to FM frequency range.

Figure 5:
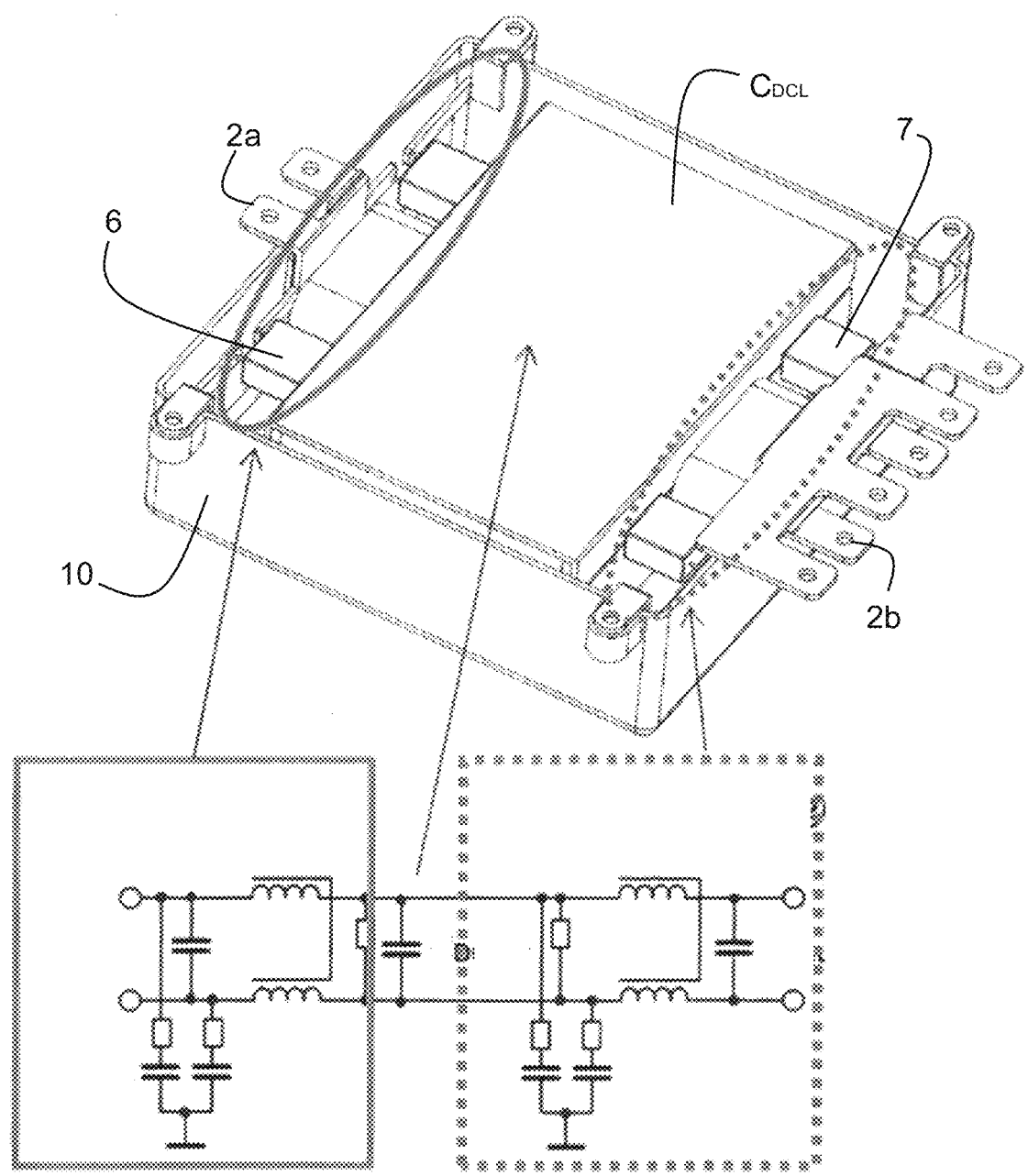
FIG. 5 shows the electrical component in a perspective view.

FIG. 5 shows the electrical component 2 in a perspective view. The DC link capacitor $C_{DCL}$ requires most of the volume of the electrical component 2. The first filter stage 6 is arranged between the input port 2a and the DC link capacitor $C_{DCL}$ and the second filter stage 7 is arranged between the output port 2b and the DC link capacitor $C_{DCL}$. By combining the EMC filter and the DC link capacitor $C_{DCL}$ into a single component comprising one chassis 10 with input and output terminals, the overall volume requirement is reduced compared to a device wherein the DC link capacitor and the EMC filter are separate components.

Figure 6:
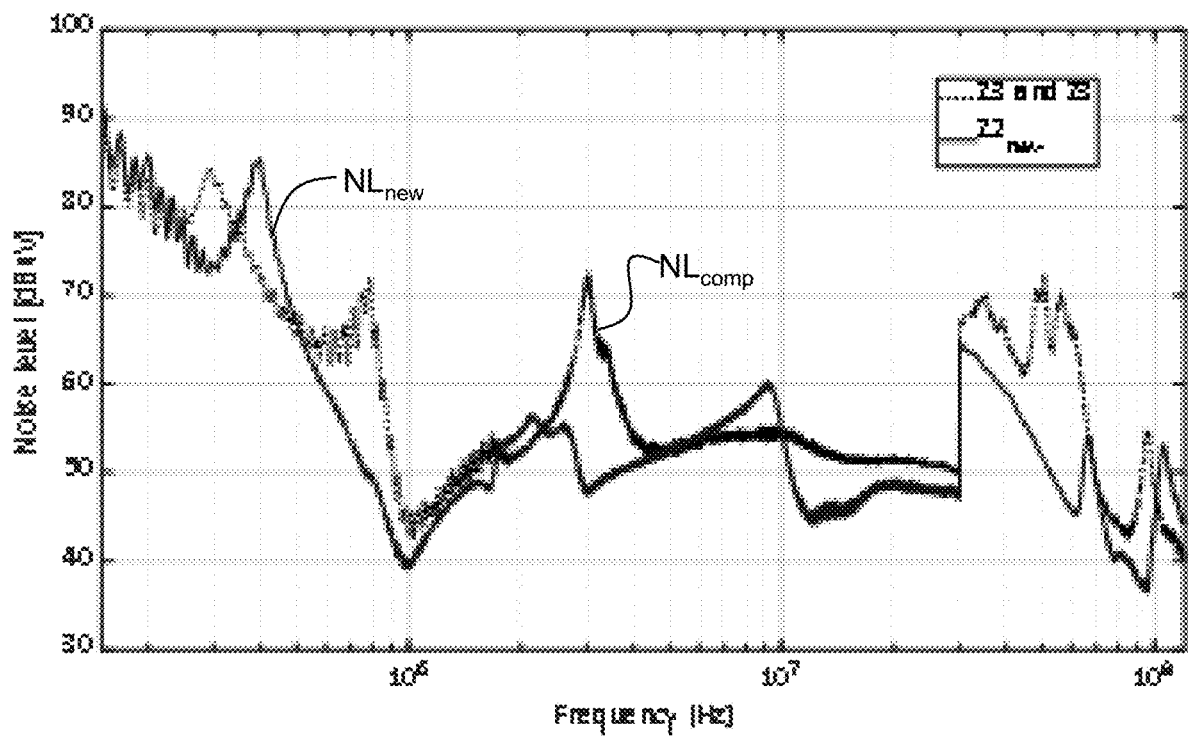
FIG. 6 shows a noise level of the power inverter circuit shown in FIG. 1 compared to the noise level of a comparative power inverter circuit.
Figure 7:
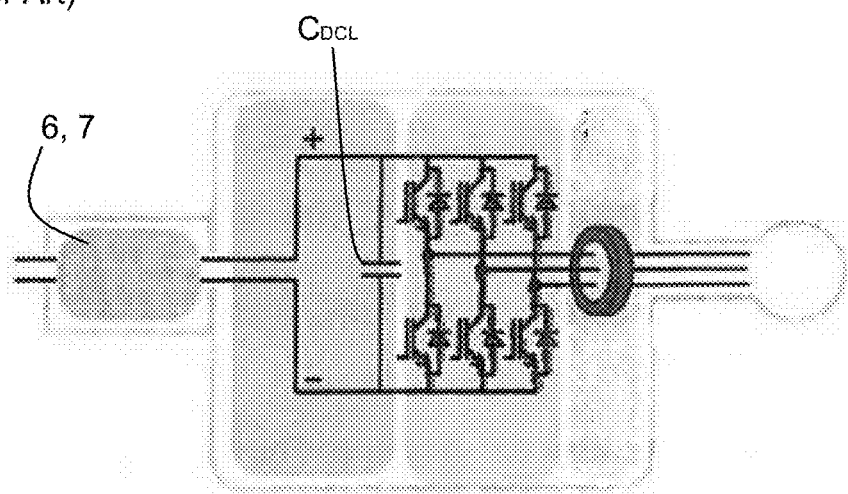
FIG. 7 shows the comparative power inverter circuit.

FIG. 6 shows the noise level $NL_{new}$ of the power inverter circuit 1 shown in FIG. 1 compared to the noise level $NL_{comp}$ of a comparative power inverter circuit wherein the EMC filter and the DC link capacitor are provided as separate elements, as shown in FIG. 7. It is shown that the noise level $NL_{new}$ for the power inverter circuit 1 comprising the electrical component 2 of the present invention is reduced compared to the comparative power inverter circuit. Thus, the performance of the power inverter circuit 1 is improved over the comparative embodiment. In particular, for frequencies above 10 MHz the noise of the power inverter circuit 1 of the present invention is reduced compared to the comparative embodiment.

REFERENCE NUMERALS 1 power inverter circuit
2 electrical component
2a input port
2b output port
3 inverter semiconductor bridge
3a input port
3b output port
4 magnetic element
6 first filter stage
7 second filter stage
8 first signal line
9 second signal line
10 chassis
$C_{DCL}$ DC link capacitor
$C_{y11}$ first y-capacitor of the first filter stage
$C_{y12}$ second y-capacitor of the first filter stage
$C_x$ x-capacitor
$Lb_1$ first magnetic element of the first filter stage
$Lb_2$ second magnetic element of the first filter stage
$C_{y21}$ first y-capacitor of the second filter stage
$C_{y22}$ second y-capacitor of the second filter stage
$C_x$ snubber capacitor
$La_1$ first magnetic element of the second filter stage
$La_2$ second magnetic element of the second filter stage
R1 first resistor
R2 second resistor
R3 third resistor
R4 fourth resistor
R5 fifth resistor
R6 sixth resistor

We claim:

1. An electrical component comprising,
a DC link capacitor and an EMC filter,
wherein the electrical component comprises an input port and an output port,
wherein the EMC filter comprises a first filter stage and a second filter stage,
wherein the first filter stage is arranged between the input port and the DC link capacitor and the second filter stage is arranged between the output port and the DC link capacitor,
wherein the first filter stage comprises an x-capacitor connected between two signal lines, and
wherein the x-capacitor has a capacitance that is less than a tenth of a capacitance of the DC link capacitor.

2. The electrical component according to claim 1, wherein the EMC filter comprises a further filter stage.

3. The electrical component according to claim 1, wherein the EMC filter and the DC link capacitor are integrated into a single circuit.

4. The electrical component according to claim 1, wherein the input port is configured for connecting the electrical component to a DC input, and
wherein the output port is configured for connecting the electrical component to an inverter semiconductor bridge.

5. The electrical component according to claim 1, wherein the electrical component is configured to receive a direct current at the input port and to provide a direct current at the output port.

6. The electrical component according to claim 1, wherein the second filter stage is configured to avoid noise migration to the DC link capacitor, or wherein the second filter stage includes at least one of a magnetic element operating as inductor or a snubber capacitor.

7. The electrical component according to claim 6, wherein the magnetic element comprises a Manganese-zinc ferrite core or a nickel-zinc ferrite core or a nanocrystalline tape core.

8. The electrical component according to claim 1, wherein the second filter stage includes a snubber capacitor, wherein the snubber capacitor is a film capacitor which comprises a plastic film, or wherein the snubber capacitor is a ceramic capacitor, or wherein the snubber capacitor is an aluminum electrolytic capacitor.

9. The electrical component according to claim 1, wherein the second filter stage comprises at least one Y capacitor connected between a signal line and a reference potential.

10. The electrical component according to claim 9, wherein the at least one Y capacitor is a film capacitor that comprises a plastic film, or wherein the at least one Y capacitor is a ceramic capacitor, or wherein the at least one Y capacitor is an aluminum electrolytic capacitor.

11. The electrical component according to claim 1, wherein the first filter stage comprises at least one Y capacitor connected between a signal line and a reference potential, or a magnetic element operating as inductor.

12. The electrical component according to claim 11, wherein the first filter stage comprises the x-capacitor, wherein the x-capacitor is a film capacitor which comprises a plastic film, or wherein the x-capacitor is a ceramic capacitor, or wherein the x-capacitor is an aluminum electrolytic capacitor.

13. The electrical component according to claim 1, wherein the first filter stage comprises a magnetic element operating as an inductor, wherein the magnetic element of the first filter stage comprises a Manganese-zinc ferrite core or a nanocrystalline tape core.

14. The electrical component according to claim 1, wherein the DC link capacitor is configured to provide capacitive noise suppression.

15. The electrical component according to claim 1, wherein the electrical component comprises at least one of a temperature sensor, a current sensor, a humidity sensor, a pressure sensor, a gas sensor, a functional component, or a module for transferring data.

16. The electrical component according to claim 1, wherein the DC link capacitor is a film capacitor which comprises a plastic film, or wherein the DC link capacitor is a ceramic capacitor, or wherein the DC link capacitor is an aluminum electrolytic capacitor.

17. A power inverter circuit comprising an electrical component according to claim 1 and an inverter semiconductor bridge, wherein the output port of the electrical component is connected to the inverter semiconductor bridge.

18. A method for manufacturing an electronic component according to claim 1, comprising the steps of:

a. manufacturing functional DC link capacitor units, b. connecting the functional DC link capacitor units to a busbar, c. manufacturing an EMC filter or filter sub-units which comprises a first filter stage and a second filter stage, d. assembling the functional DC link capacitor units connected to the busbar and the EMC filter or the filter sub-units in a housing, wherein step c. is performed either before step a., or before step b. or before step d.

19. The method according to claim 18, wherein, in step d., a sensor and/or a functional component is assembled in the housing.

20. An electrical component comprising, a DC link capacitor and an EMC filter, wherein the electrical component comprises an input port and an output port, wherein the EMC filter comprises a first filter stage and a second filter stage, wherein the first filter stage is arranged between the input port and the DC link capacitor and the second filter stage is arranged between the output port and the DC link capacitor, wherein the first filter stage comprises at least one Y capacitor connected between a signal line and a reference potential, wherein the second filter stage comprises a snubber capacitor, and wherein the snubber capacitor has a capacitance that is less than a tenth of a capacitance of the DC link capacitor.

* * * * *